(12) United States Patent
Graff

(10) Patent No.: US 10,582,101 B2
(45) Date of Patent: Mar. 3, 2020

(54) THERMAL COMPENSATION IN AN INTEGRATED IMAGE SENSOR AND LENS ASSEMBLY

(71) Applicant: GoPro, Inc., San Mateo, CA (US)

(72) Inventor: Emilio Graff, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/081,449

(22) Filed: Mar. 25, 2016

(65) Prior Publication Data
US 2016/0295081 A1 Oct. 6, 2016

Related U.S. Application Data

(60) Provisional application No. 62/141,673, filed on Apr. 1, 2015, provisional application No. 62/160,473, filed on May 12, 2015.

(51) Int. Cl.
*H04N 5/225* (2006.01)
*G02B 9/64* (2006.01)
*G02B 7/02* (2006.01)

(52) U.S. Cl.
CPC .......... *H04N 5/2254* (2013.01); *G02B 7/021* (2013.01); *G02B 7/028* (2013.01); *G02B 9/64* (2013.01)

(58) Field of Classification Search
CPC ........ H04N 5/2254; G02B 9/64; G02B 7/028; G02B 7/021; G02B 27/0075
See application file for complete search history.

(56) References Cited

U.S. PATENT DOCUMENTS

| | | | | |
|---|---|---|---|---|
| 5,137,349 A * | 8/1992 | Taniguchi | ........... | G03F 7/70241 353/101 |
| 7,595,943 B2 * | 9/2009 | Yuan | ...................... | G02B 7/028 359/820 |
| 8,567,678 B2 * | 10/2013 | Ohara | .................... | G02B 7/021 235/454 |
| 2010/0001071 A1 * | 1/2010 | Ohara | .................... | G02B 7/021 235/454 |
| 2016/0161702 A1 * | 6/2016 | Yang | ...................... | G02B 7/028 359/503 |

* cited by examiner

*Primary Examiner* — Ahmed A Berhan
(74) *Attorney, Agent, or Firm* — Young Basile Hanlon & MacFarlane, P.C.

(57) ABSTRACT

An integrated image sensor and lens assembly comprises a lens barrel holding camera lenses coupled to a lens mount. The lens mount is further coupled to an image sensor substrate that has an image sensor lying on an image plane. The optical distance between lenses and the image sensor is tuned such that the focal plane of the lenses coincides with the image plane. Due to thermal expansion, this optical distance may vary thereby to cause the focal plane of the lenses to shift away from the image plane. The integrated image sensor and lens assembly further comprises spacers that couple one or more lens elements to the lens barrel. The spacers and the lens elements are configured such that the optical distance is maintained to be constant or substantially constant.

20 Claims, 4 Drawing Sheets

THERMAL COMPENSATION IN AN INTEGRATED IMAGE SENSOR AND LENS ASSEMBLY

CROSS-REFERENCE TO RELATED APPLICATIONS

This application claims the benefit of U.S. Provisional Application No. 62/141,673 filed Apr. 1, 2015 and of U.S. Provisional Application No. 62/160,473 filed May 12, 2015, both of which are hereby incorporated herein by reference in their entirety.

BACKGROUND

1. Technical Field

This disclosure relates to a camera, and more specifically, to thermal compensation in integrated image sensor and lens assemblies.

2. Description of the Related Art

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In an integrated image sensor and camera lens system, a lens is coupled to an image sensor. A camera lens includes one or more lens elements. A camera lens can be coupled to the image sensor with a single-piece integrated mount or an assembly of at least a barrel holding the lens elements and a mount positioning the barrel with respect to the image sensor such that the image sensor is properly aligned with the lens to maintain image quality. For example, in a "permafocus" design, the camera lens is rigidly coupled to the image sensor after some alignment procedure.

The integrated system is susceptible to changes induced by environment. For example, camera lenses tend to defocus due to a temperature change. The defocus is a result of several factors, including thermal expansion of the lens elements, change in index of refraction of the lens elements, and thermal expansion of the barrel/mount and other components of the assembly. Thermal expansion is a function of the temperature change and the coefficient of thermal expansion (CTE) of the material.

BRIEF DESCRIPTION OF DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
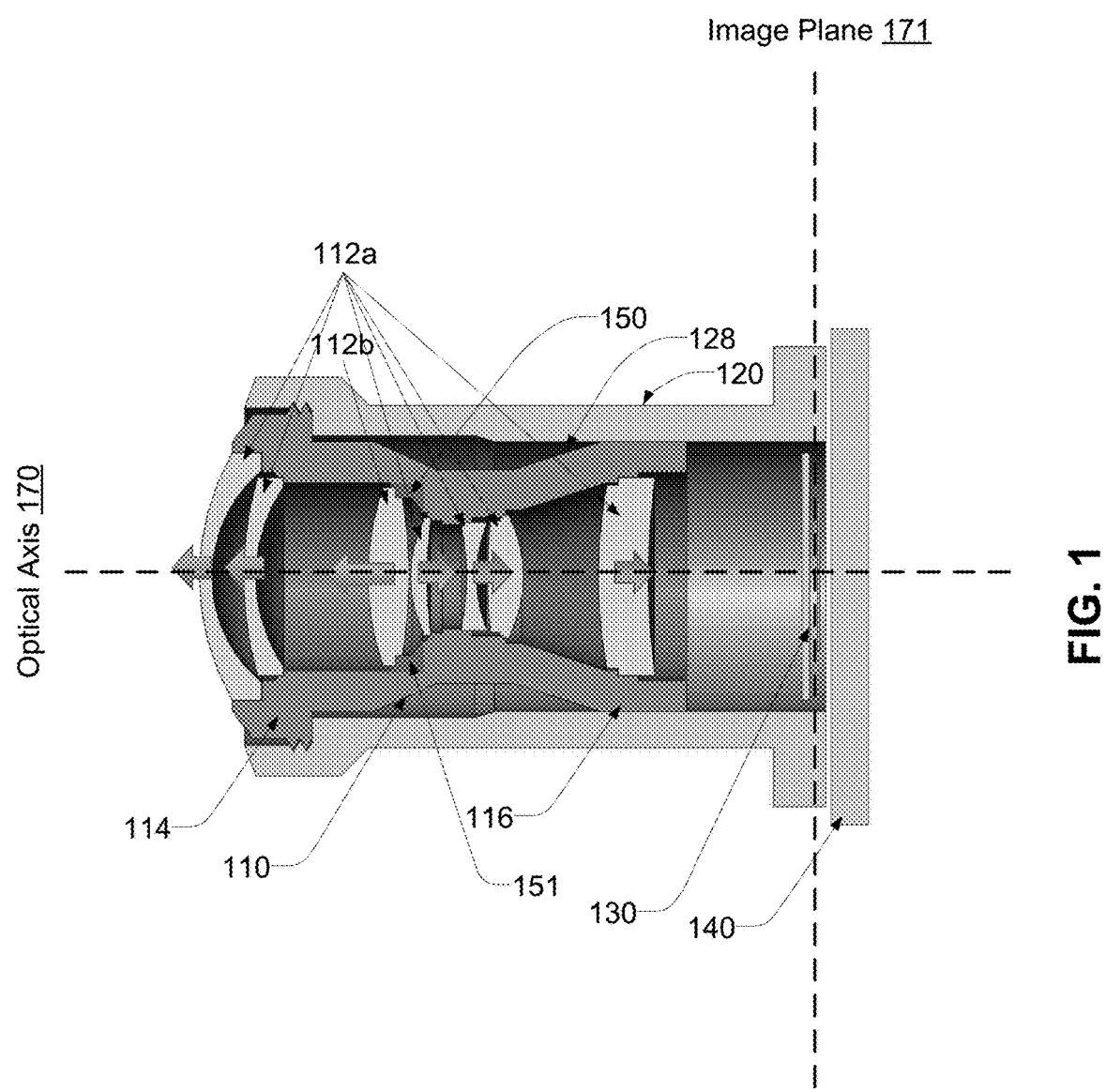
FIG. 1 illustrates an exploded view of an integrated image sensor substrate and camera lens system configuration, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein. Those skilled in the art will appreciate that structures and methods described herein may be implemented in devices such as cameras and projectors.

In the assembly process, the focal plane of the lens is aligned with the image plane of the sensor. Lenses can be designed, to some extent, including materials that have favorable thermo-optic coefficients. The barrels, mounts, and other mechanical parts can be made of materials with the required coefficients of thermal expansion (CTEs) to keep thermal performance changes within some pre-defined tolerance. However, manufacturing and cost limitations sometimes necessitate a less than optimal material selection, and this results in a movement of the focal plane relative to the image plane as a function of temperature. In a camera lens including multiple lens elements, the position of the focal plane is more sensitive to some elements than others. Thus, it is possible to manipulate the position of the focal plane by moving certain lens elements relative to the others. When the defocus problem is due to temperature, this can be achieved passively by prescribing a particular thermal expansion between two or more lens elements which is different than the thermal expansion of the barrel holding the lens elements in place, effectively moving one or more lens elements in a different direction and/or magnitude with respect to the others. This manipulation can result in a net movement of the focal plane relative to the image plane which is within some pre-defined tolerance without otherwise causing detriment to the image quality. The pre-defined tolerance can be, for example, a percentage tolerance in the modulation transfer function (MTF), physical size of the circle of least confusion, a particular fraction of the Rayleigh range at the primary wavelength, etc.

Often times, lens assemblies include spacers to mechanically locate lens elements in the barrel. In such designs, the spacer CTE and dimension can be chosen so as to favorably manipulate the focal plane position as a function of temperature. However, this change can also be achieved by local changes in temperature, for example, by routing system heat to a particular location in the lens assembly, or by actively heating and cooling different sections of the assembly.

An integrated image sensor and lens assembly comprises a lens barrel holding a set of camera lens elements coupled to a lens mount. The lens mount is further coupled to an image sensor substrate that has an image sensor lying on an image plane. The optical distance between the set of lenses and the image sensor is tuned such that the focal plane of the lenses coincides with the image plane. Due to thermal expansion of the lens barrel and the lens mount, the optical distance between the lens elements and the image sensor may vary thereby to cause the focal plane of the set of lenses to shift away from the image plane. The integrated image sensor and lens assembly further comprises one or more spacers that couple a subset of the set of lens elements to the lens barrel. The spacers and the subset of the set of lens elements are configured such that the optical distance between the set of lens elements and the image sensor is maintained to be constant or substantially constant. As described herein, substantially constant refers to the optical distance is within a predefined tolerance that would be acceptable to those skilled in art. In various embodiments, the predefined tolerance can be, for example, a 1% tolerance, a 2% tolerance, a 5% tolerance, etc. The spacers may move the subset of lens elements in such a way that the optical distance of the set of lens elements and the image sensor is maintained to be constant or substantially constant. In response to a temperature change, the motion of the subset of lens elements may be at a different magnitude and direction with respect to the rest of the lens elements.

FIG. 1 illustrates an exploded view of an embodiment of an integrated image sensor substrate and camera lens system configuration 100 that includes a camera lens barrel 110, a camera lens mount 120, one or more spacers 150-151, and an image sensor substrate 140. The image sensor substrate 140 has an image sensor assembly 130 (e.g., a high-definition image sensor) for capturing images and/or video. The camera lens mount 120 is physically affixed to the image sensor substrate 140 and also affixed to the camera lens barrel 110.

The lens barrel 110 comprises one or more lens elements or other optical components 112 to direct light to the image sensor assembly. The lens barrel 110 is affixed to the lens mount 120 with a threaded joint 114 positioned to minimize the thermal shift of the focal plane relative to the image plane 171. The lens barrel 110 comprises a lower portion 116, one or more barrel arms 114, and a lens window (which may be one of the lens elements 112). The lower portion 116 of the lens barrel 110 is substantially cylindrical and structured to at least partially extend into the channel of the tube portion 128 of the camera lens mount 120. The barrel arms 114 extend radially from the body of the lens barrel 110 and are outside the channel of the lens mount 120 when assembled. The lens arms 114 may be used to physically couple the lens barrel 110 to the camera body (not shown). The lens window includes optical components to enable external light to enter the lens barrel 110 and be directed to the image sensor assembly 130. The camera lens mount 120 includes a tube portion 128 that extends away from the image sensor assembly along the optical axis 170 and includes a substantially cylindrical channel for receiving the lens barrel 110. The back portion of the lens barrel 116 can be used for axial alignment relative to the mount 120.

The image sensor substrate 140 comprises a printed circuit board for mounting the image sensor assembly 130 and may furthermore include various electronic components that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the camera lens mount 120. The image sensor of the image sensor assembly 130 lies on an image plane 171. The combined focal plane of the lens elements 112 including the lens window and lens elements inside barrel 116 is maintained to coincide with the image plane 171.

The lens barrel 110 is made of a material having a coefficient of thermal expansion that causes the lens barrel 110 to expand with increasing temperature. As a result of this expansion, the lens elements 112 move further apart from each other with increasing temperature. Absent other compensation, the increased distances between the lenses cause a shift in the position of the focal plane so that the image is no longer focused at the image sensor.

In order to compensate for the shift in focal plane caused by thermal expansion of the lens barrel 110, one or more spacers 150-151 are mounted to an inner surface of the lens barrel 110 and structured to couple one or more of the lens elements 112b to the lens barrel 110. In the illustrated example, the lens element 112b is coupled (e.g., mounted) to the inner surface of the lens barrel 110 via the one or more spacers 150-151 while the lenses 112a are directly coupled (e.g., mounted) to the inner surface of the lens barrel 110. In one embodiment, the one or more spacers 150-151 are adhered to the lens barrel 100 using an adhesive and the lens element 112b is then adhered to the one or more spacers and further adhered to the lens elements 112 so that the lens element 112b is not directly attached to the lens barrel 100. The spacers 150-151 are made of a material which has a coefficient of thermal expansion different from that of the material of the lens barrel 110. As a result, the lens element 112b will shift with temperature by a different amount and/or direction than the other lens elements 112a and thereby change the position of lens element 112b with respect to the other lens elements 112a. This causes a shift in the focal plane opposite the shift caused by all of the lens elements 112a-112b moving apart due to expansion of the lens barrel 110, thereby compensating for the thermal effects. Particularly, the material of the spacers 150-151 are chosen such that the shift in the focal plane caused by expansion of the lens barrel 110 is exactly or approximately compensated for by the additional shift of the lens element 112b relative to the other lens elements 112a. In one embodiment, the thermal compensating elements 150-151 are structured to hold only the lens elements 112b of which the movement most substantially affects the focal plane of the lenses 112a-b. In some embodiments, the spacers 150-151 are maintained at a different temperature than the barrel 110 by heating or cooling of the respective parts relative to each other. In one embodiment, the spacers 150-151 are a ring-shaped spacer.

Figure 2:
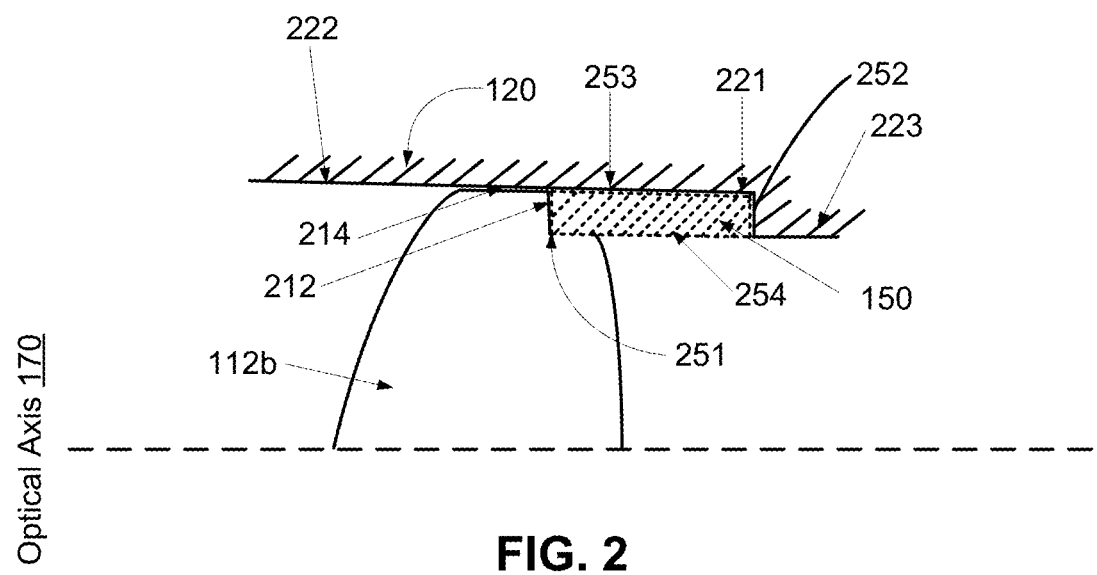
FIG. 2 illustrate an example spacer coupling (e.g., mounting) a lens element to a lens barrel, according to one embodiment.
Figure 3:
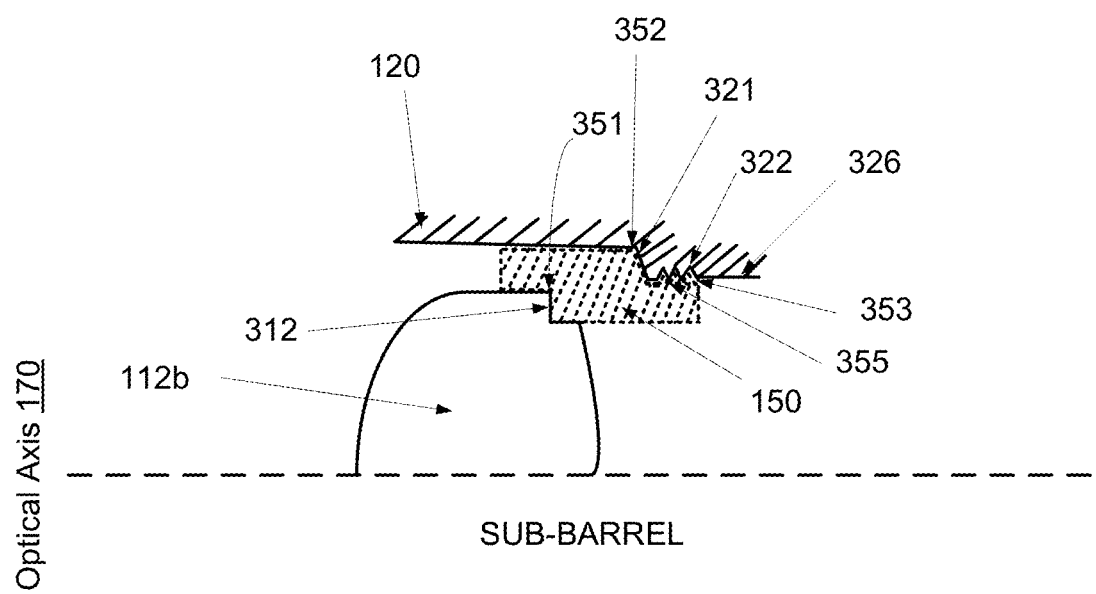
FIG. 3 illustrate an example spacer coupling (e.g., mounting) a lens element to a lens barrel, according to one embodiment.
Figure 4:
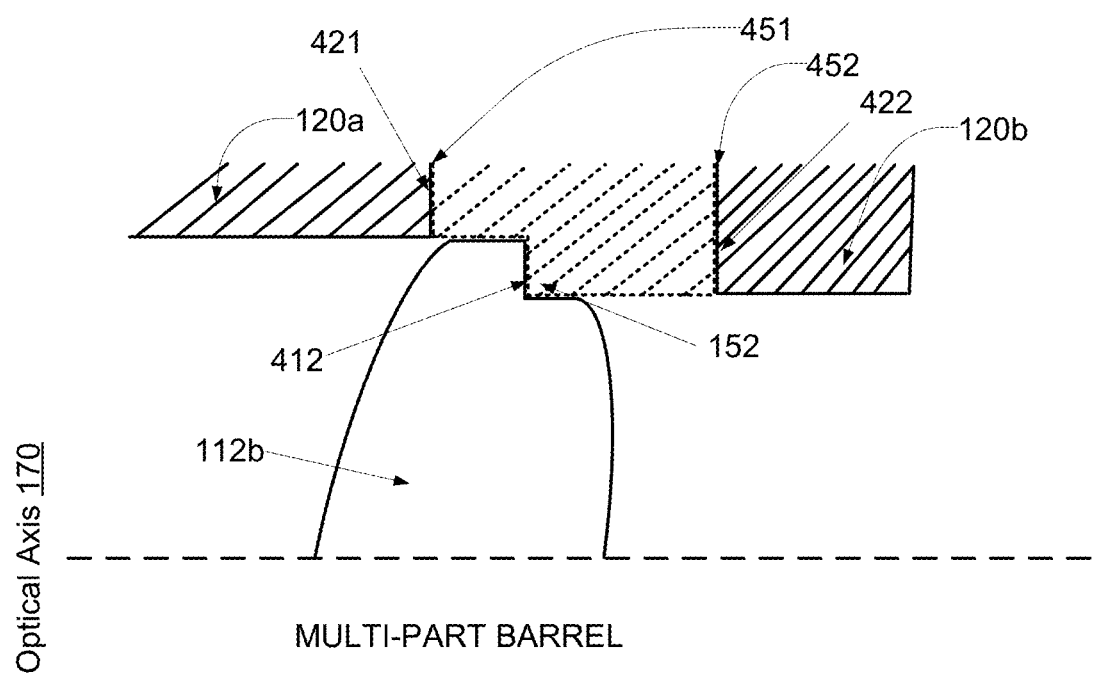
FIG. 4 illustrate an example spacer coupling (e.g., mounting) a lens element to a lens barrel, according to one embodiment.

FIGS. 2-4 illustrate examples of spacers 150 coupling (e.g., mounting) a lens element 112b to a lens barrel 120. Each of these views illustrate one half of a cross-sectional view, which is axisymmetric. In the embodiment of FIG. 2, the spacer 150 (e.g., a ring-shaped spacer) is adhered to the barrel 120 on one side (e.g., an outer surface) and adhered to the lens element on the opposite side (e.g., an inner surface) so that it can expand by a different amount relative to the barrel 120. For particularly, the lens barrel 120 is shaped to include offset inner surfaces 222 and 223 parallel to the optical axis 170 that meet at a surface perpendicular or diagonal with respect to the optical axis 170, thus forming a corner 221. The spacer 150 may be mounted (e.g., using adhesive) to the inner surface 222 of the lens barrel 120 at the corner 221. The lens element 112b is also shaped to include a corner 212. The spacer may be mounted (e.g., using adhesive) to the lens element 112b at the corner 212. The spacer 150 has surfaces 251-254. For example, the surface 251 of the spacer 150 is attached to the lens element 112b by adhesive. The surface 253 of the spacer 150 is in contact with or in close proximity to the inner surface 222 of the lens barrel 120 and is structured in a manner that allows the spacer 150 to expand at a rate different from that of the lens barrel 120. The surface 214 of the lens element 112b may also be in contact with or in close proximity to the inner surface 222 of the lens barrel 120 in a manner that enables the lens element 112b to move relative to the lens barrel 120 and to maintain the lens element 112b centered inside the lens barrel 120. Accordingly, the motion of the lenses 112b may be in a direction and/or magnitude different from that of the lenses 112a.

In FIG. 3, rather than gluing the spacer 150 the lens barrel 120, the lens element is glued into the spacer 150 which is structured as an offset cylindrical sub-barrel, and this sub-barrel is then affixed to the main lens barrel 120 using, for example, a threaded fastening system. The lens barrel 120 is shaped to include offset surfaces parallel to the optical axis 170 that meet at a surface perpendicular or diagonal with respect to the optical axis 170, thus forming a corner 321. The lens barrel 120 further includes a fastening structure such as threads 322 on its surface 326. The spacer 150 is shaped to include offset surfaces parallel to the optical axis 170 that meet at a surface perpendicular or diagonal with respect to the optical axis 170 thus forming a reciprocal corner 352 that is substantially flush with (e.g., are in contact or in proximity with) the corner 321 of the lens barrel 120. The spacer 150 further includes a fastening structure such as threads 353 on its surface 355 that mate with (e.g., are in contact or in proximity with) the threads 322 of the lens barrel 120. The other side of the spacer 150 further includes a corner 351 that mates with a corner of the lens element 112b and may be further coupled, for example, by an adhesive. The lens element 112b is also shaped to include a corner 312, reciprocal to the corner 351. As such, the lens element 112b may be adhered to the spacer 150, for example, via adhesive. Such a configuration allows the lens element 112b to move relative to the lens barrel 120 based on a different rate of thermal expansion of the spacer 150. Accordingly, the motion of the lenses 112b may be different from that of the lenses 112a in response to temperature change.

FIG. 4 illustrates another example of a spacer 150 coupling a lens element 112b to a lens barrel 120. In this example, rather than having a uniform lens barrel 120 and a separate spacer 150, the spacer 150 is integrated with the lens barrel 120. Particularly, the lens barrel 120 includes multiple segments or subsections 120a-b. The spacer 150 is sandwiched between the segments or subsections 120a and 102b. The surface 451 of the spacer 150 adheres to the surface 421 of the lens barrel segment or subsection 120a, and the surface 452 of the spacer 150 adheres to the surface 422 of the lens barrel segment or subsection 120b. The spacer 150 may be coupled to the lens barrel segments or subsections 120a-b via various structures such as adhesive, fasteners (e.g., hooks, joins, latches, pins, etc.), or overmold. The spacer 150 is shaped to include a corner 152 and the lens element 112b is shaped to include a reciprocal corner 412 that mates with the corner 152 (e.g., using an adhesive). Such a configuration allows the lens element 112b to move relative to the other lenses 112a because the spacer 150 expands at a different rate with temperature change than the other portions 120a, 120b of the lens barrel 120. Accordingly, the motion of the lenses 112b may be different from that of the lenses 112a in response to temperature change.

In yet another embodiment, instead of using a spacer 150 with different coefficient of thermal expansion than the lens barrel 120, the position of a given lens element 112b can be adjusted relative to the other lenses 112a by applying a different temperature to the portion of the lens barrel 120 holding the lens element 112b. For example, using heating and/or cooling elements along the lens barrel 120, a portion of the lens barrel 120 can be kept at a different temperature than the other portions of the lens barrel 120, thereby causing one lens element 112b to move with respect to the other lenses with temperature change. The heating and/or cooling elements can be passively or actively controlled to compensate for the shift in the focal plane caused by thermal expansion of the lens barrel 120.

Example Camera System Configuration

Figure 5:
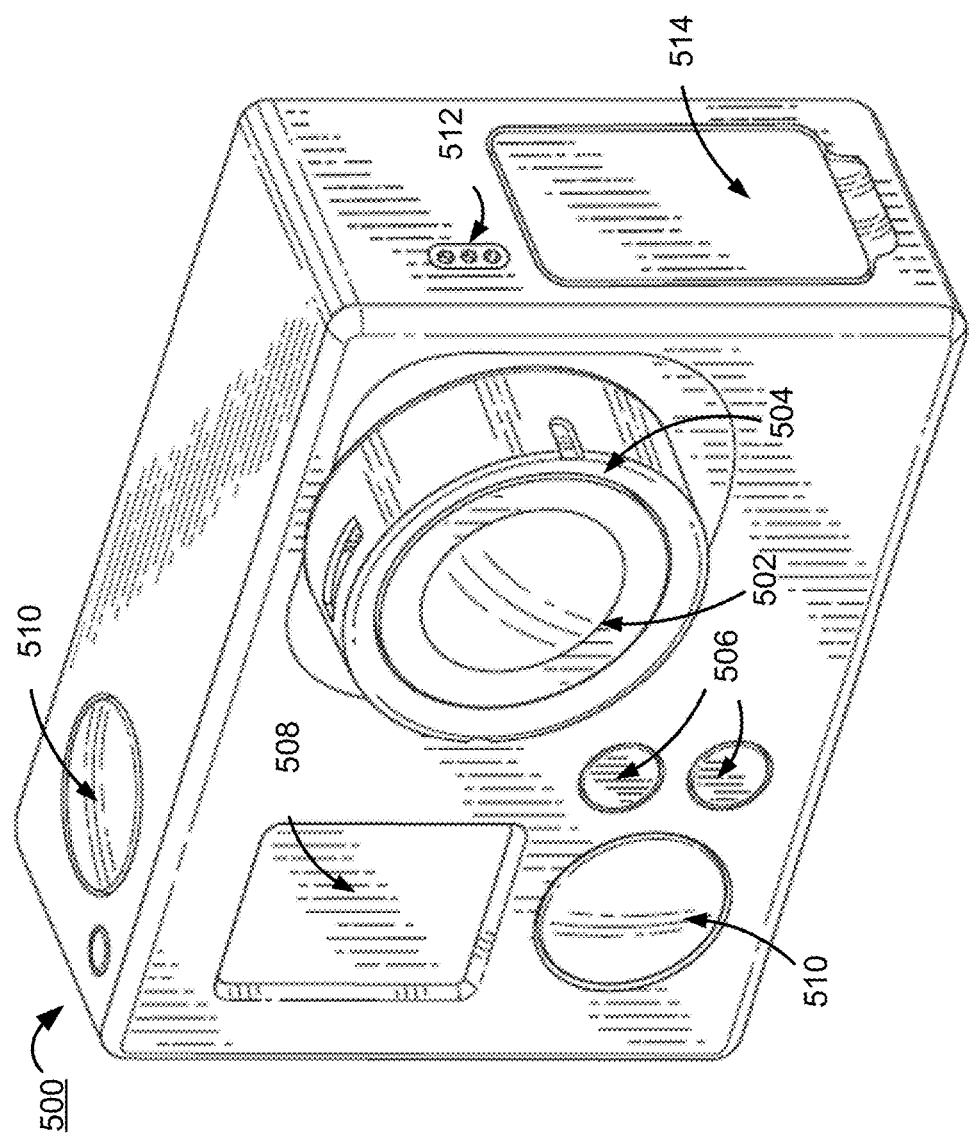
FIG. 5 illustrates an example camera that includes the integrated image sensor and lens assembly, according to one embodiment.

FIG. 5 illustrates an embodiment of an example camera 500 that includes the integrated image sensor and lens assembly 100 described above. The camera 500 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The cameral 500 is configured to capture images and video, and to store captured images and video for subsequent display or playback. As illustrated, the camera 500 includes a lens 502 configured to receive light incident upon the lens and to direct received light onto an image sensor internal to the lens. The lens 502 is enclosed by a lens ring 504, which are both part of the integrated image sensor and lens assembly 100 discussed above.

The camera 500 can include various indicators, including the LED lights 506 and the LED display 508. The camera 500 can also include buttons 510 configured to allow a user of the camera to interact with the camera, to turn the camera on, and to otherwise configure the operating mode of the camera. The camera 500 can also include a microphone 512 configured to receive and record audio signals in conjunction with recording video. The side of the camera 500 includes an I/O interface 514.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated image sensor and lens assembly comprising:
    an image sensor substrate comprising an image sensor;
    lens elements for directing light to the image sensor;
    a lens barrel housing the lens elements, the lens barrel coupled to a lens mount and comprising a first material that expands with temperature increase causing a first shift in a focal plane in a first direction along an optical axis;
    one or more spacers coupled between one or more of the lens elements and the lens barrel, the one or more spacers comprising a second material that expands with temperature increase causing a second shift in the focal plane in a second direction along the optical axis opposite the first direction, the second material being different than the first material; and
    one or more temperature changing elements coupled to the lens barrel, the one or more temperature changing elements controllable to compensate for the first shift in the focal plane in the first direction along the optical axis by providing a first temperature at a first portion of the lens barrel and by providing a second temperature at a second portion of the lens barrel.

2. The integrated image sensor and lens assembly of claim 1, wherein the one or more spacers and the lens elements are configured to maintain an optical distance between the lens elements and the image sensor that is constant or substantially constant.

3. The integrated image sensor and lens assembly of claim 1, further comprising:
    the lens mount coupled to the image sensor substrate, the lens mount comprising a tube portion extending from a base portion in a direction of an optical axis substantially perpendicular to the focal plane, the tube portion having a channel and the lens barrel having a portion extending into the channel.

4. The integrated image sensor and lens assembly of claim 1, wherein the lens barrel includes a first corner and a lens element of the lens elements includes a second corner, and one of the one or more spacers is shaped to mate with the first corner and the second corner.

5. The integrated image sensor and lens assembly of claim 4, wherein the one of the one or more spacers has a first surface and a second surface, the first surface attached to the lens barrel at the first corner and the second surface attached to the lens element at the second corner.

6. The integrated image sensor and lens assembly of claim 1, wherein
    the lens barrel includes a first surface, a second surface, and a first corner, the first surface offset to the second surface, the first surface and the second surface form the first corner,
    a lens element of the lens elements includes a second corner, and
    one of the one or more spacers is shaped to include offsetting surfaces, a third corner, and a fourth corner, the third corner reciprocal to the first corner and the fourth corner reciprocal to the second corner.

7. The integrated image sensor and lens assembly of claim 6, wherein the second surface of the lens barrel includes a first fastening structure, and a surface of the one of the one or more spacers includes a second fastening structure, the second fastening structure to engage with the first fastening structure.

8. The integrated image sensor and lens assembly of claim 6, wherein the first surface and the second surface of the lens barrel and the offsetting surfaces of the one of the one or more spacers are parallel to the optical axis.

9. The integrated image sensor and lens assembly of claim 1, wherein the lens barrel includes a first segment and a second segment, and one of the one or more spacers is sandwiched between the first segment and the second segment.

10. The integrated image sensor and lens assembly of claim 9, wherein the one of the one or more spacers includes a first corner, and a lens element of the lens elements includes a second corner reciprocal to the first corner.

11. An integrated image sensor and lens assembly comprising:
    an image sensor substrate comprising an image sensor;
    lens elements for directing light to the image sensor;
    a lens barrel housing the lens elements, the lens barrel coupled to a lens mount and comprising a material that expands with temperature increase causing a shift in a focal plane along an optical axis; and
    one or more temperature changing elements coupled to the lens barrel, the one or more temperature changing elements controllable to compensate for the shift by providing a first temperature at a first portion of the lens barrel and by providing a second temperature at a second portion of the lens barrel.

12. The integrated image sensor and lens assembly of claim 11, wherein the lens elements are configured to maintain a substantially constant optical distance between the lens elements and the image sensor.

13. The integrated image sensor and lens assembly of claim 11, further comprising:
    the lens mount coupled to the image sensor substrate, the lens mount comprising a tube portion extending from a base portion in a direction of an optical axis substantially perpendicular to the focal plane, the tube portion having a channel and the lens barrel having a portion extending into the channel.

14. The integrated image sensor and lens assembly of claim 11, wherein the lens barrel includes a first corner and a lens element of the lens elements includes a second corner, and spacers are shaped to mate with the first corner and the second corner.

15. The integrated image sensor and lens assembly of claim 14, wherein a first spacer of the spacers has a first surface and a second spacer of the spacers has a second surface, the first surface attached to the lens barrel at the first corner and the second surface attached to the lens element at the second corner.

16. The integrated image sensor and lens assembly of claim 11, wherein the lens barrel includes a first surface, a second surface, and a first corner, the first surface offset to the second surface, the first surface and the second surface forming the first corner, wherein a lens element of the lens elements includes a second corner, and wherein spacers are shaped to include offsetting surfaces, a third corner, and a fourth corner, the third corner reciprocal to the first corner and the fourth corner reciprocal to the second corner.

17. The integrated image sensor and lens assembly of claim 16, wherein the second surface of the lens barrel includes a first fastening structure, and a surface of the spacers includes a second fastening structure, the second fastening structure to engage with the first fastening structure.

18. The integrated image sensor and lens assembly of claim 11, wherein the one or more temperature changing elements comprise heating and cooling elements.

19. The integrated image sensor and lens assembly of claim 11, wherein the one or more temperature changing elements are any of passively controlled and actively controlled to compensate for the shift.

20. The integrated image sensor and lens assembly of claim 11, wherein the one or more temperature changing elements apply different temperatures to different portions of the lens barrel to compensate for the shift.

* * * * *